(12) United States Patent
Trott et al.

(10) Patent No.: US 6,735,258 B1
(45) Date of Patent: May 11, 2004

(54) MODERATE RATE PHASE SHIFT KEYING CODEC

(75) Inventors: Mitchell D. Trott, Mountain View, CA (US); Tibor Boros, Sunnyvale, CA (US)

(73) Assignee: ArrayComm, Inc., San Jose, CA (US)

( * ) Notice: Subject to any disclaimer, the term of this patent is extended or adjusted under 35 U.S.C. 154(b) by 592 days.

(21) Appl. No.: 09/675,910

(22) Filed: Sep. 29, 2000

(51) Int. Cl.[7] .............................................. H04L 27/20
(52) U.S. Cl. ...................................................... 375/308
(58) Field of Search ................................ 375/308, 329, 375/279, 295, 316, 341, 269; 714/794, 795

(56) References Cited

U.S. PATENT DOCUMENTS 5,396,518 A * 3/1995 How ........................... 375/265
5,555,547 A * 9/1996 Lemaitre et al. ............ 375/262
5,757,856 A * 5/1998 Fang ........................... 375/265

OTHER PUBLICATIONS

Pottie et al., Multilevel Codes Based on Partitioning, 1989, pp. 87–98.
Wolf et al., P2 Codes: Pragmatic Trellis Codes Utilizing Punctured Convolutional Codes, 1995, pp. 94–99.
IEEE Transactions on Information Theory, vol. 42, No. 2, Mar. 1996, pp. 627–636.

* cited by examiner

Primary Examiner—Khai Tran
(74) Attorney, Agent, or Firm—Blakely, Sokoloff, Taylor & Zafman LLP

(57) ABSTRACT

A method and apparatus are provided that yields bandwidth efficient low bit rate communication of digital signals in a noisy channel. According to one aspect of the present invention, the invention includes demultiplexing a received input bit stream to divide it into a first block and a second block, convolutionally coding the first block, block coding the second block, mapping the convolutionally coded first block to a sequence of three-bit symbols, so that the bits of the convolutionally coded first block make up one bit of each three-bit symbol, mapping the block coded bits of the second block to the sequence of three-bit symbols, so that the bits of the block coded second block make up two bits of the three-bit symbol, and mapping the three-bit symbols to a phase shift keyed constellation.

23 Claims, 3 Drawing Sheets

MODERATE RATE PHASE SHIFT KEYING CODEC

BACKGROUND OF THE INVENTION

1. Field of the Invention

The invention relates generally to the field of digital signal modulation and coding. More particularly, the invention relates to a low rate codec using convolutional and block coding with a phase shift keying constellation.

2. Description of the Related Art

Presently in transmitting and receiving digital data across noisy channels, it is difficult to find a suitable compromise between adequate bandwidth efficiency and adequate error correction capabilities. With full error correction coding, the bit rate becomes too low or the bandwidth requirements too high. With only modest error correction coding, much of the transmitted signal can become unrecoverable at the receiver. In order to provide a robust communications link, the data should be recoverable and yet bandwidth limitations should be honored.

The present invention provides a unique combination of error correction coding that allows for a very robust communication link in noisy channels. It is suitable for any kind of digital signal processing systems but is particularly suitable for wireless digital data communications systems.

BRIEF SUMMARY OF THE INVENTION

A method and apparatus are provided that yields bandwidth efficient low bit rate communication of digital signals in a noisy channel. According to one aspect of the present invention, the invention includes demultiplexing a received input bit stream to divide it into a first block and a second block, convolutionally coding the first block, block coding the second block, mapping the convolutionally coded first block to a sequence of three-bit symbols, so that the bits of the convolutionally coded first block make up one bit of each three-bit symbol, mapping the block coded bits of the second block to the sequence of three-bit symbols, so that the bits of the block coded second block make up two bits of each three-bit symbol, and mapping the three-bit symbols to a phase shift keyed constellation.

Other features of the present invention will be apparent from the accompanying drawings and from the detailed description that follows.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

Figure 1:
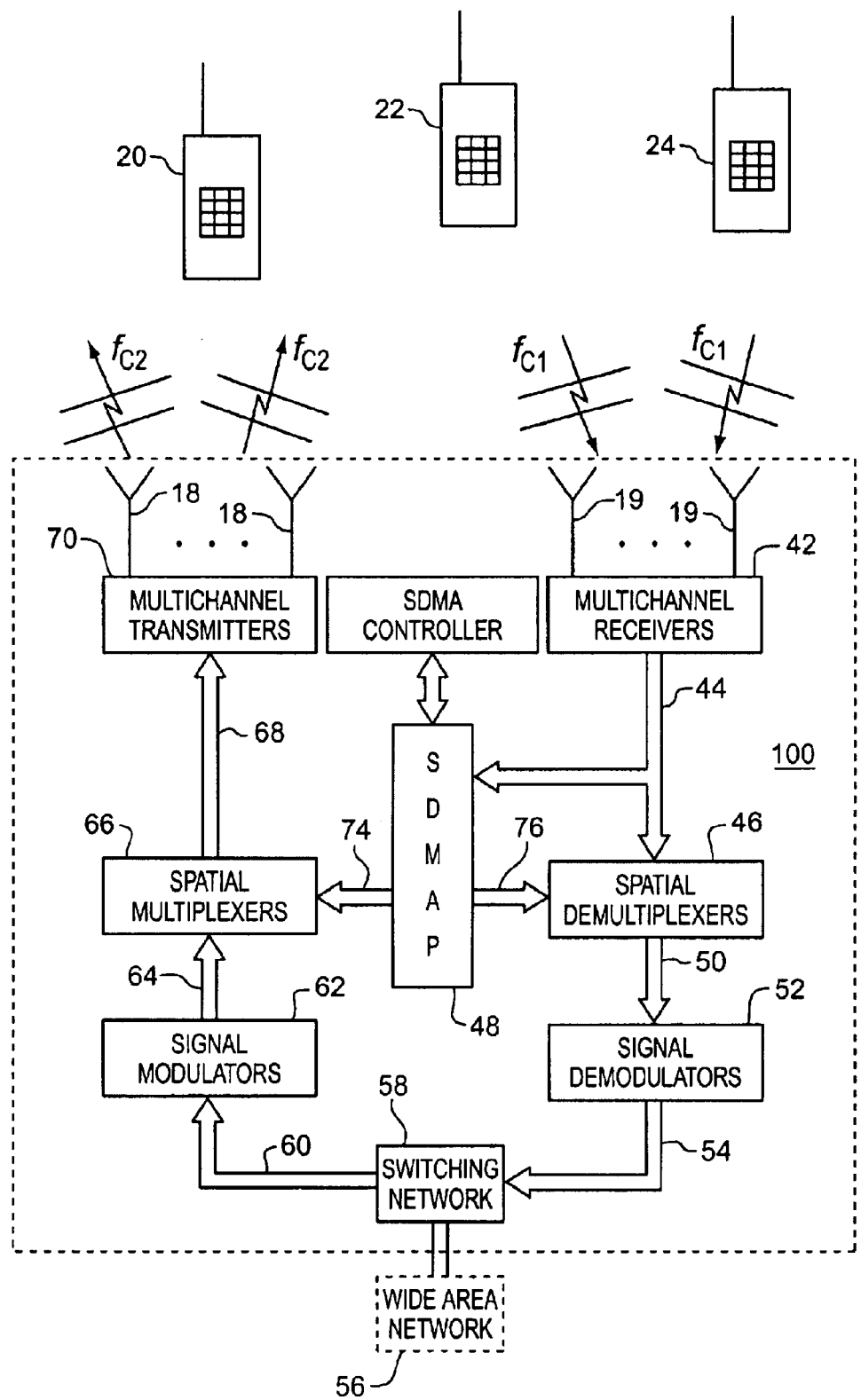
FIG. 1 is a block diagram illustrating an exemplary architecture of a wireless communication system appropriate for use with one embodiment of the present invention.

FIG. 1 shows an example of a wireless communications system or network in which a number of subscriber stations, also referred to as remote terminals or user terminals, (symbolically shown as handsets) 20, 22, 24, are being served by a base station 100 that may be connected to a wide area network (WAN) 56 for providing any required data services and connections external to the immediate wireless system. The present invention relates to wireless communication systems and may be a fixed-access or mobile-access wireless network using spatial division multiple access (SDMA) technology in combination with multiple access systems, such as time division multiple access (TDMA), frequency division multiple access (FDMA) and code division multiple access (CDMA). Multiple access can be combined with frequency division duplexing (FDD) or time division duplexing (TDD). A switching network 58 interfaces with a WAN 56 for providing multi-channel duplex operation with the WAN by switching incoming WAN data to lines 60 of the base station 100 and switching outgoing signals from the base station 100, on lines 54 to the WAN. Incoming lines 60 are applied to signal modulators 62 that produce modulated signals 64 for each subscriber station to which the base station is transmitting. A set of spatial multiplexing weights for each subscriber station are applied 74 to the respective modulated signals in spatial multiplexers 66 to produce spatially multiplexed signals 68 to be transmitted by a bank of multi-channel transmitters 70 using a transmit antenna array 18. The SDMA processor (SDMAP) 48 produces and maintains spatial signatures for each subscriber station for each conventional channel, calculates spatial multiplexing and demultiplexing weights for use by spatial multiplexers 66, and spatial demultiplexers 46, and uses the received signal measurements 44 to select a channel for a new connection. In this manner, the signals from the current active subscriber stations, some of which may be active on the same conventional channel, are separated and interference and noise suppressed. When communicating from the base station to the subscriber stations, an optimized multi-lobe antenna radiation pattern tailored to the current active subscriber station connections and interference situation is created. Suitable technologies for achieving such a spatially directed beam are described, for example, in U.S. Pat. No. 5,828,658, issued Oct. 27, 1998 to Ottersten et al. and U.S. Pat. No. 5,642,353, issued Jun. 24, 1997 to Roy, III et al.

Returning to FIG. 1, spatial demultiplexers 46 combine received signal measurements 44 from the multi-channel receivers 42 and associated antenna array 19 according to spatial demultiplexing weights 76, a separate set of demultiplexing weights being applied for each subscriber station communicating with the base station. The outputs of the spatial demultiplexers 46 are spatially separated signals 50 for each subscriber station communicating with the base station. In an alternate embodiment, the demultiplexing and demodulation processing are performed together in a non-linear multidimensional signal processing unit. The demodulated received signals 54 are then available to the switching network 58 and the WAN 56. The multi-channel receivers also receive timing signals from GPS (Global Positioning System) satellites or some other radio precision timing signal which is then provided to the SDMAP for precise timing that is synchronized across all base stations in the system.

In an FDMA system implementation, each multi-channel receiver and each multi-channel transmitter is capable of handling multiple frequency channels. In other embodiments, the multi-channel receivers 42 and multi-channel transmitters 70 may instead handle multiple time slots, as in a TDMA system, multiple codes, as in a CDMA system, or some combination of these well-known multiple access techniques.

In one embodiment of the invention, the SDMAP accomplishes its task by first obtaining estimates of important signal related parameters such as their directions-of-arrival (DOAs) without exploiting temporal properties of the signal. This is appropriate, for example, in situations where analog modulation schemes are employed and little is known about the signal waveform. In a second embodiment, known training sequences placed in digital data streams for the purpose of channel equalization can be used in conjunction with sensor array information to calculate signal parameter estimates such as DOAs and signal power levels. This information is then used to calculate appropriate weights 76 for a spatial demultiplexer, implemented in this embodiment as a linear combiner, i.e., a weight-and-sum operation. In a third embodiment, time-of-arrival (TOA)-related parameters from the parameter estimator are used in conjunction with signal correlation parameters to ascertain which signals are multi-path versions of a common signal. Relative delays are then calculated such that the signals can be coherently combined, thus further increasing the quality of the estimated signals.

However, in another embodiment of this invention, the function of the spatial demultiplexer is performed in conjunction with the estimation of other source parameters such as the DOAs. As an example of one such embodiment of this type, the constant modulus property (i.e., constant amplitude) of various communication signals such as digital phase-shift-keyed (PSK) and analog FM waveforms can be exploited along with properties of the array of receiving antennas to simultaneously estimate the source waveforms as well as their DOAs using multi-channel constant-modulus algorithms (CMA) which are well-known in the art.

In another embodiment, extended Kalman filters, also well-known in the art, can be used to exploit these and similar properties. In these and similar embodiments, the function of the spatial demultiplexer 46 is assumed by the SDMAP 48, and the outputs 76 of the SDMAP are the spatially demultiplexed signals to be sent to the demodulators.

Figure 2:
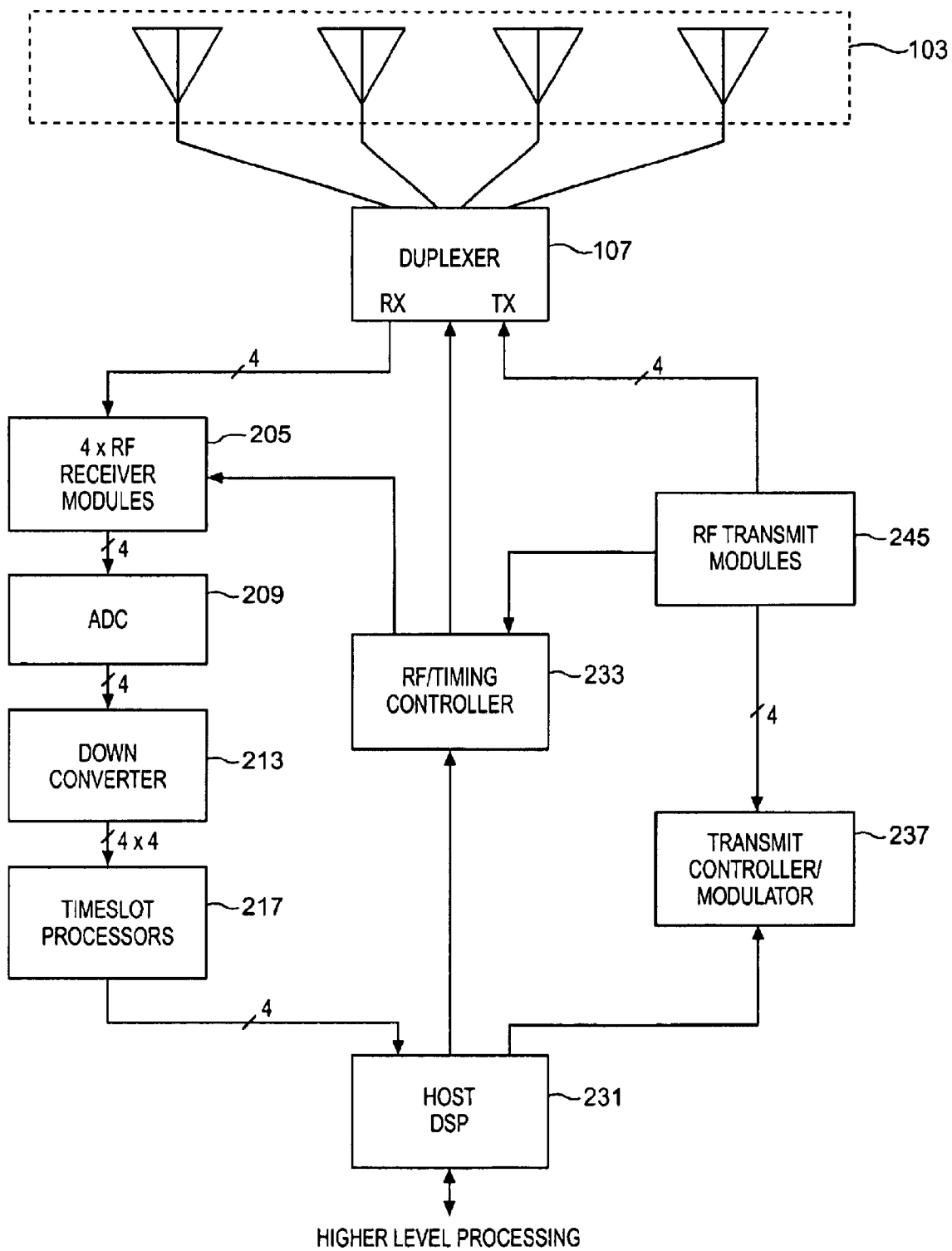
FIG. 2 is a block diagram illustrating an alternate exemplary architecture of a wireless communications system appropriate for use with the present invention.

FIG. 2 shows an alternative embodiment of a wireless communications system suitable for implementing the present invention. This system is typically coupled to a switching network and WAN similarly to the system of FIG. 1 such as switching network 58 and WAN 56. In FIG. 2, a plurality of antennas 103 is used, for example four antennas, although other numbers of antennas may be selected. The outputs of the antennas are connected to a duplexer switch 107, which in this TDD system is a time switch. Two possible implementations of switch 107 are as a frequency duplexer in a frequency division duplex (FDD) system, and as a time switch in a time division duplex (TDD) system. When receiving, the antenna outputs are connected via switch 107 to a receiver 205, and are mixed down in analog by RF receiver ("RX") modules 205 from the carrier frequency (for example around 1.9 GHz) to an FM intermediate frequency ("IF") of, for example, 384 kHz. This signal then is digitized (sampled) by analog to digital converters ("ADCs") 209 at, for example, 1.536 MHz. Only the real part of the signal is sampled. Thus, in complex phasor notation, the digital signal can be visualized as containing the complex valued IF signal at 384 kHz together with an image at −384 kHz. Final down-converting to baseband is carried out digitally by multiplying the 1.536 megasamples per second real-only signal by a 384 kHz complex phasor. The result is a complex valued signal that contains the complex valued baseband signal plus an image at, for example, −2×384=−768 kHz. This unwanted negative frequency image is filtered digitally to produce the complex valued baseband signal sampled at 1.536 MHz. GrayChip Inc. GC2011 digital filters can be used to implement the down-converting and the digital filtering, the latter using finite impulse response (FIR) filtering techniques. This is shown as block 213. The particular frequencies suggested above are provided by way of example. The invention can be adapted to suit a wide variety of RF and IF carrier frequencies and bands.

There are, in the present example, four down-converted outputs from each antenna's GC2011 digital filter device 213, one per receive timeslot. The particular number of timeslots can be varied to suit network needs. While the present example uses four uplink and four downlink timeslots for each TDD frame, desirable results have also been achieved with three timeslots for the uplink and downlink in each frame. For each of the four receive timeslots, the four down-converted outputs from the four antennas are fed to a digital signal processor (DSP) device 217 (hereinafter "timeslot processor") for further processing, including calibration, according to one aspect of this invention. Four Motorola DSP56303 DSPs can be used as timeslot processors, one per receive timeslot.

The timeslot processors 217 perform several functions including the following: received signal power monitoring; frequency offset estimation and time alignment; smart antenna processing including determining weights for each antenna element to determine a signal from a particular remote user; and demodulation of the determined signal.

The output of the timeslot processor 217 is demodulated burst data for each of the four receive timeslots. This data is sent to a host DSP processor 231 whose main function is to control all elements of the system and interface with the higher level processing, which is the processing which deals with what signals are required for communications in all the different control and service communication channels defined in the system's communication protocol. The host DSP 231 can be a Motorola DSP56303. In addition, timeslot processors send the determined receive weights to the host DSP 231. The main functions of the host DSP 231 specifically include:

maintaining state and timing information;
  receiving uplink burst data from the timeslot processors 217;
  programming the timeslot processors 217;
  processing the uplink signals, including de-encrypting, de-scrambling, error correcting code checking, and burst deconstruction of the uplink;
  formatting the uplink signal to be sent for higher level processing in other parts of the base station;
  formatting service data and traffic data for further higher processing in the base station;
  receiving downlink messages and traffic data from the other parts of the base station;
  processing of downlink bursts (burst construction, encoding, scrambling and encryption);
  formatting and sending downlink bursts to a transmit controller/modulator, shown as 237;
  programming the transmit controller/modulator 237, including determining and sending transmit weight vectors to the transmit controller/modulator 237;
  controlling the RF controller shown as 233; and
  maintaining and reporting modem status information, and controlling synchronization.

The RF controller 233 interfaces with the RF system, shown as block 245 and also produces a number of timing signals that are used by both the RF system and the modem. The specific tasks performed by the RF controller 233 include:

producing timing signals for the RF system (RX and TX) and other parts of the modem;

reading transmit power monitoring values;

writing transmit power control values;

producing the duplexer 107 switch box control signal; and reading automatic gain control (AGC) values.

the RF controller 233 receives timing parameters and other settings for each burst from the host DSP 231.

The transmit controller/modulator 237, receives transmit data from the host DSP 231, four symbols at a time. The transmit controller uses this data to produce analog IF outputs which are sent to the RF transmitter (TX) modules 245. The specific operations transmit controller/modulator 237 performs are:

converting data bits into a complex modulated signal;

up-converting to an IF frequency using, for example, a GrayChip 2011;

4-times over-sampling the IF signal;

multiplying this 4-times over-sampled complex signal by transmit weights obtained from host DSP 231; and converting the real part of the resulting complex valued waveforms via digital to analog converters ("DACs") which are part of transmit controller/modulator 237 to analog transmit waveforms which are sent to the transmit modules 245.

The transmit modules 245 up-convert the signals to the transmission frequency and amplify the signals. The amplified transmission signal outputs are sent to antennas 103 via the duplexer/time switch 107.

Figure 3:
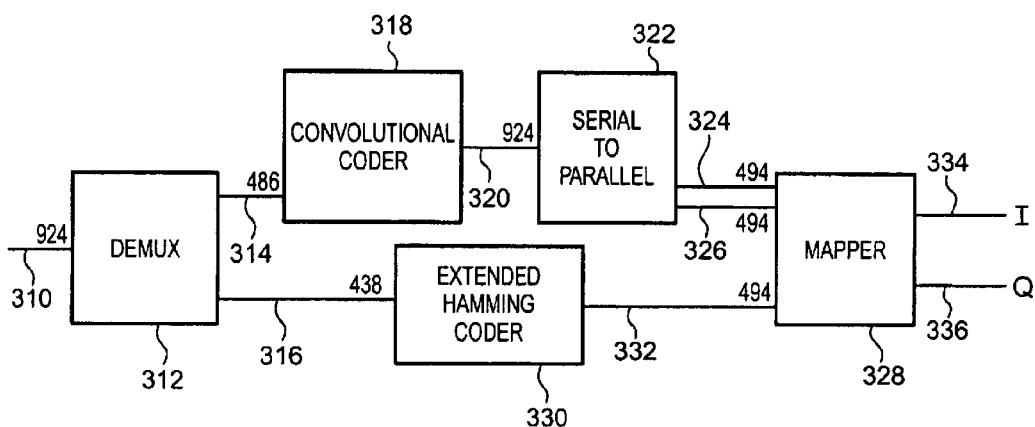
FIG. 3 is block diagram of a codec according to one embodiment of the present invention.

FIG. 3 shows a block diagram of a signal modulator, corresponding to block 62 of FIG. 1, or block 237 of FIG. 2, according to one embodiment of the present invention. While only the portion related to encoding is shown, the invention is equally applicable to decoding with appropriate reversal of the described steps as is implemented in the signal demodulator 52 of FIG. 1 and as well-known in the art. In one example, the blocks shown in FIG. 3 are implemented in a general purpose DSP (digital signal processor) such as a Motorola 56300 series DSP.

In one embodiment, the incoming bit stream 310 is processed in 1115-bit blocks, although the precise number of bits may be varied here as well as throughout the description to better suit particular applications. In the present invention, a 1115-bit block has been chosen because the number of symbols selected for transmission in each downlink time slot of each time division duplex frame has been selected as 494. As discussed below, applying the methods of the present invention maps the 1115 bits into 494 symbols. For the uplink slot 182 symbols has been selected for each slot, accordingly the input block has 405 bits. The particular selections of symbol rates and input block sizes can be selected to suit the particular application as appropriate. The 1115-bit block is encrypted and contains some error detecting coding such as a 16-bit cyclic redundancy code in the last 16 bit positions. This encryption and coding is typically performed at earlier stages of physical layer processing by the same general purpose DSP.

The 1115 bits are divided roughly in quarters in a demultiplexer 312 so that roughly one-quarter goes to a 239 bit stream upper path 314 and roughly three quarters to a 876 bit stream lower path 316. The division is done by assigning the initial 239 bits to the upper path 314 and the succeeding 876 bits to the lower path 316. However, the bits can be divided in any convenient fashion that is reversible in a receive channel. The upper path is provided to a convolutional coder 318.

In one embodiment, this convolutional coder has 256 states and is of constraint length 9 with 1 message bit per 2 coded bits. The coder is defined by the two generator sequences 561 and 753 (octal) or equivalently 101110001 and 111101011 (binary). The first and second generator sequences define the shift register taps for the first and second encoder output bits, respectively. The coder is initialized to the zero state before each 239 bit block and eight tail bits of value zero are added to the end of each 239 bit block. The outputs of the encoder are concatenated serially, alternating between the two shift register taps of the generator sequences to form a coded output bit stream of 494 bits. Many other convolutional codes may be used with the present invention to suit particular applications as is well-known in the art. The 494-bit convolutionally coded blocks are passed next to a mapper 322 which provides I and Q signal lines 334, 336 to be mapped into an 8PSK constellation to be described in greater detail below.

In one embodiment, the coded output bit stream is then punctured to delete the fourth and sixth bit from every set of six bits. Accordingly the output encoded bit stream 320 of the convolutional coder is formed into 124 four-bit blocks. The structure, after puncturing, is $c_1c_2c_3c_5$, $c_7c_8c_9c_{11}$, $c_{13}c_{14}c_{15}c_{17}$, . . . , where c represents a convolutionally coded bit. In order to maintain the coded output on line 320 at 494 bits, the input 314 to the convolutional coder is accordingly increased to about 360 bits. Other puncturing schemes may also be selected applying techniques well-known in the art.

The lower 876-bit output 316 of the demultiplexer 312 is applied to an extended Hamming coder 324. The extended Hamming coder first breaks the 876 bit block into 15 blocks of 57 bits and one block of 21 bits. 36 tail bits of value zero are appended to the 21-bit block to bring it to 57 total. The coder then calculates and appends a six parity bit Hamming code to each 57 bit block and then calculates and appends an overall parity bit to each 63-bit block. Finally, after the codes are calculated, the originally appended 36 zero tail bits are removed. The result is 15 64-bit blocks formed from the original 57-bit blocks and 1 28-bit block formed from the 21-bit block. The 28-bit block has parity bits based on the 21 bits plus 36 zeroes. The total 988 bits form the output 326 of the coder 324.

The 988-bit coded block is passed next to a serial to parallel mapper 328. This mapper takes the odd bits and feeds them to an upper line 330 as a 494-bit block. The even bits are fed to a lower line output 332 as a second 494-bit block. The two output lines are connected to a second mapper 322 which provides I and Q signal lines 334, 336 to be mapped into the 8 PSK constellation.

The 8PSK mapper 322 takes the three inputs 320, 330, 332 of 494 bits each and builds a three-bit symbol from 000 to 111. The symbols are built using the top line 330 from the block coder 324 as the most significant bit, then the lower line 332 from the block coder as the next bit and the convolutional coded line 320 as the least significant bit, however, the bits may be combined in any other way. Any one 1115-bit block input to the demultiplexer 312 on the main input line 310 will accordingly be mapped into 494 consecutive three-bit symbols. These are presented as I and Q coordinates on the I and Q lines 334, 336 and then mapped into the 8 PSK constellation for transmission over the channel as is well known in the art. In the system architecture of FIG. 1, the PSK constellation is modulated onto the appropriate carrier and transmitted through antennas 18 or the antennas of the remote terminals 20, 22, 24. The table below shows the respective values that would be produced on the I and Q lines for each possible binary symbol combination from 000 to 111.

|  | Point | | | | | | | |
| --- | --- | --- | --- | --- | --- | --- | --- | --- |
|  | 0 | 1 | 2 | 3 | 4 | 5 | 6 | 7 |
| I, Q | 0, 1 | $2^{-1/2}, 2^{-1/2}$ | 1, 1 | $-2^{-1/2}, 2^{-1/2}$ | $-1, 0$ | $-2^{-1/2}, -2^{-1/2}$ | $-1, -1$ | $2^{-1/2}, -2^{-1/2}$ |
| Symbol | 000 | 001 | 010 | 011 | 110 | 111 | 100 | 101 |
| Value | 0 | 1 | 2 | 3 | 6 | 7 | 4 | 5 |

Figure 4:
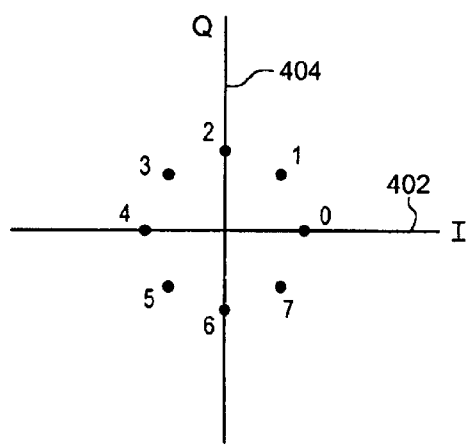
FIG. 4 is a diagram of an 8PSK constellation for use in one embodiment of the present invention.

FIG. 4 shows an exemplary 8 PSK constellation. The constellation has an I (in-phase) axis 402 and an orthogonal Q (quadrature) axis 404. Each of the eight constellation points are labeled from 0 to 7. These points correspond to the "Point" row shown in the table above. As the table shows, each point is associated with a binary number from 000 to 111 (with a corresponding decimal value from 0 to 7) and has corresponding I and Q coordinates. Note, however, that the symbols are not mapped in order as the circle is traversed. Instead, gray labeling of the most significant two bits is used so that the most significant bits alternate at every other point as the circle is traversed. While the mapping is shown in the table as directed to the corresponding binary number, any other type of mapping may be used as is well-known in the art. For example, binary values can be mapped to every other or every third or fourth point around the circle of the constellation in order to obtain a more desirable distribution of symbols for transmission. Accordingly, for example, 000 maps to point 0, while 001 maps to point 3, 010 maps to point 6, etc.

As mentioned above, the size of the blocks input to the system can be varied in order to accommodate different system requirements. In the example above, a 1115-bit block was selected for a downlink slot of 494 symbols. However, other size blocks can be used. In another example, mentioned above, 182 symbols is selected for an uplink slot. To accommodate this smaller set of symbols, the input block on line 310 is 405 bits. This can be divided so that the first 83 bits are sent on line 314 to the convolutional coder and the second 322 bits are sent to the block coder. The convolutional coder generates a 182 bit block that is fed to the mapper 322 on line 320. The extended Hamming coder, using the same 57-bit block at a time scheme discussed above creates a 364-bit block that is divided by the serial to parallel mapper into two 182 bit blocks on lines 330 and 332. The three 182-bit blocks are then mapped into three-bit symbols as discussed above. While two examples have been set forth herein, many more possibilities can be developed as is well-known in the art.

As can be seen from the specific example provided above, the present invention converts a 1115-bit block into three 494-bit blocks that are mapped into 494 three-bit symbols, or, in the alternative, a 405-bit block is mapped into 182 three-bit symbols. Accordingly, the system provides roughly 2½ bits per symbol. The 2½ bit-per-symbol rate provides a desirable mix of redundancy and error detection with bandwidth efficiency for many noisy channels.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIG. 1, or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media or machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while the present invention has been described in the context of a wireless internet data system for portable handsets, it can be applied to a wide variety of different wireless systems in which data is exchanged. Such systems include voice, video, music, broadcast and other types of data systems without external connections. The present invention can be applied to fixed remote terminals as well as to low and high mobility terminals. Many of the methods are described herein in a basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

What is claimed is:

1. A method comprising:
   demultiplexing a bit stream into a first block and a second block;
   convolutionally coding the first block;
   block coding the second block;
   mapping the convolutionally coded first block to a sequence of three-bit symbols, the bits of the convolutionally coded first block making up one bit of each three-bit symbol;

mapping the block coded second block to the sequence of three-bit symbols, the bits of the block coded second block making up two bits of each three-bit symbol; and mapping the three-bit symbols to a phase shift keyed constellation.

2. The method of claim 1, wherein demultiplexing the bit stream comprises placing a first successive portion of the stream into the first block and a second successive portion of the stream into the second block, so that the first block has approximately one fourth as many bits as the second block.

3. The method of claim 1, wherein convolutionally coding the first block comprises applying a 1 message bit per 2 coded bits convolutional coder.

4. The method of claim 1, wherein convolutionally coding comprises applying a coder with at least 128 states and a constraint length of at least eight.

5. The method of claim 1, wherein mapping the coded bits to a sequence of three-bit symbols comprises mapping the convolutionally coded bits to the least significant bit of each symbol.

6. The method of claim 1, wherein block coding the second block comprises adding a Hamming code to the second block.

7. The method of claim 1, wherein mapping the block coded bits to the three-bit symbols comprises mapping the block coded bits to the most significant bits of the three-bit symbols.

8. The method of claim 1, wherein mapping the three-bit symbols to a phase shift keyed constellation comprises mapping the three-bit symbols to an 8 PSK constellation.

9. The method of claim 1, further comprising puncturing the convolutionally coded bits of the first block before mapping.

10. An apparatus comprising:

a demultiplexer to divide an incoming bit stream into a first block and a second block;

a convolutional coder coupled to the demultiplexer to receive and code the first block;

a block coder coupled to the demultiplexer to receive and code the second block;

a first mapper to divide the coded second block into two blocks; and a second mapper to map the coded first block and the two blocks of the coded second block to a sequence of three-bit symbols in a phase shift keyed constellation.

11. The apparatus of claim 10, wherein the convolutional coder comprises a 1 message bit per 2 coded bits convolutional coder.

12. The apparatus of claim 10, wherein the convolutional coder comprises a coder with at least 128 states and a constraint length of at least five.

13. The apparatus of claim 10, wherein the block coder comprises a Hamming code block coder.

14. The apparatus of claim 10, wherein the phase shift keyed constellation comprises an 8 PSK constellation.

15. A machine-readable medium having stored thereon data representing sequences of instructions which, when executed by a machine, cause the machine to perform operations comprising:

demultiplexing a bit stream into a first block and a second block;

convolutionally coding the first block;

block coding the second block;

mapping the convolutionally coded first block to a sequence of three-bit symbols, the bits of the convolutionally coded first block making up one bit of each three-bit symbol;

mapping the block coded second block to the sequence of three-bit symbols, the bits of the block coded second block making up two bits of each three-bit symbol; and mapping the three-bit symbols to a phase shift keyed constellation.

16. The medium of claim 15, wherein the instructions for demultiplexing the bit stream comprise instructions causing the machine to perform operations comprising placing a first successive portion of the stream into the first block and a second successive portion of the stream into the second block, so that the first block has approximately one fourth as many bits as the second block.

17. The medium of claim 15, wherein the instructions for convolutionally coding the first block comprise instructions causing the machine to perform operations comprising applying a 1 message bit per 2 coded bits convolutional coder.

18. The medium of claim 15, wherein the instructions for mapping the coded bits to a sequence of three-bit symbols comprise instructions causing the machine to perform operations comprising mapping the convolutionally coded bits to the least significant bit of each symbol.

19. The medium of claim 15, wherein the instructions for block coding the second block comprise instructions causing the machine to perform operations comprising adding a Hamming code to the second block.

20. An apparatus comprising:

means for demultiplexing a bit stream into a first block and a second block;

means for convolutionally coding the first block;

means for block coding the second block;

means for mapping the convolutionally coded first block to a sequence of three-bit symbols, the bits of the convolutionally coded first block making up one bit of each three-bit symbol;

means for mapping the block coded second block to the sequence of three-bit symbols, the bits of the block coded second block making up two bits of each three-bit symbol; and means for mapping the three-bit symbols to a phase shift keyed constellation.

21. The apparatus of claim 20, wherein the means for demultiplexing the bit stream comprises means for placing a first successive portion of the stream into the first block and a second successive portion of the stream into the second block, so that the first block has approximately one fourth as many bits as the second block.

22. The method of claim 20, wherein the means for block coding the second block comprises means for adding a Hamming code to the second block.

23. The method of claim 20, wherein the means for mapping the three-bit symbols to a phase shift keyed constellation comprises means for mapping the three-bit symbols to an 8 PSK constellation.

* * * * *